United States Patent [19]

Atkins et al.

[11] Patent Number: 5,166,291

[45] Date of Patent: Nov. 24, 1992

[54] POLYESTER COMPOSITIONS

[75] Inventors: Kenneth E. Atkins, South Charleston; Gary C. Rex, Cross Lanes, both of W. Va.

[73] Assignee: Union Carbide Chemicals & Plastics Technology Corporation, Danbury, Conn.

[21] Appl. No.: 826,244

[22] Filed: Jan. 27, 1992

Related U.S. Application Data

[63] Continuation of Ser. No. 221,658, Jul. 20, 1988, abandoned.

[51] Int. Cl.$^5$ ............................................. C08L 67/06
[52] U.S. Cl. ..................................... 523/508; 524/86; 524/98; 524/99; 524/104; 525/27; 525/28; 525/47; 525/170
[58] Field of Search ...................... 525/27, 28, 47, 170; 523/508; 524/98, 99, 104, 86

[56] References Cited

U.S. PATENT DOCUMENTS

| 2,987,499 | 6/1961 | Werner | 525/47 |
| 3,956,421 | 5/1976 | Roberts | 526/264 |
| 4,035,439 | 7/1977 | Stevenson | 528/28 |
| 4,374,215 | 2/1983 | Atkins | 523/514 |
| 4,525,498 | 6/1985 | Atkins | 523/511 |
| 4,673,706 | 6/1987 | Atkins | 525/31 |
| 4,755,557 | 7/1988 | Atkins | 525/27 |

Primary Examiner—Patricia A. Short
Attorney, Agent, or Firm—P. W. Leuzzi

[57] ABSTRACT

Unsaturated polyester fiber reinforced molding compounds containing low profile additives achieve moldings with improved shrinkage control, improved surface appearance, less separation and lower coefficient of thermal expansion by the addition of lactams.

5 Claims, No Drawings

POLYESTER COMPOSITIONS

This application is a continuation of prior U.S. application Ser. No. 221,658, filing date, Jul. 20, 1988, now abandoned.

BACKGROUND OF THE INVENTION

1. Field of the Invention

This invention relates to polyester molding compositions and more particularly to compositions having improved physical appearances with respect to rippling waviness.

2. Prior Art

Unsaturated polyester resins have been employed commercially in various fiber reinforced fabrication systems including among others matched metal-die compression, transfer, and injection molding. These systems involve curing a formulated compound at high temperatures and pressures in hardened and polished molds. These methods provide the highest volume and highest part uniformity of any thermoset molding technique.

A technical improvement that has made a significant contribution to commercial thermosetting molding is the use of low profile additives to reduce shrinkage during the curing reaction and to thereby improve dimensional stability and surface smoothness. Low profile additives are, in general, thermoplastic polymers such as vinyl acetate polymers, acrylic polymers, polyurethane polymers, polystyrene, butadiene styrene copolymers, saturated polyesters and polycaprolactones.

A major advance in commercial thermosetting molding technology was the introduction several years ago of chemically thickened systems. Chemical thickening is always employed in sheet molding compounds ("SMC"), and is increasingly being used in bulk molding compounds ("BMC"). In such systems, and alkaline material such as magnesium oxide or magnesium hydroxide is added to, for example, an uncured polyester along with fillers, glass fiber, and other standard materials. The alkaline material interacts with residual acidity in the polyester to build viscosity. The thickened system is relatively tack free and easy to handle, and the high viscosity carries the glass fiber reinforcement to the extremities of the mold during crosslinking of the system. Thus, the use of thickened systems has made a major contribution to the commerical expansion of polyester molding.

While low profile unsaturated polyester fiber glass reinforced molding systems have gained wide acceptance in the transportation industry because of good surface appearance, dimensionsal stability, physical properties, production and assembly costs and weight savings versus metal, there is still a need for further improvement in reducing rippling and waviness.

In response to these increased demands the art has developed a variety of answers.

U.S. Pat. No. 4,525,498 teaches a low profile additive compostion containing a thermosetting unsaturated polyester, a thermoplastic polymer additive to control shrinkage and an ethylenically unsaturated monomer suitable for use in molding application the improvement being incorporating into said mixture and epoxy compound having at least one 1, 2 epoxy group per molecule said epoxy compound being essentially free of reactive unsaturation.

U.S. Pat. No. 4,374,215 teaches a polyester molding composition comprising:

(a) a polyester resin comprising the reaction product of an olefinically unsaturated dicarboxylic acid or anhydride and a polyol;

(b) an olefinically unsaturated monomer that is copolymerizable with said polyester resin;

(c) a thermoplastic polymer low profile additive to control shrinkage; and (d) an effective amount of a second crosslinkable vinyl monomer having a reactivity ratio ($r_1$) with styrene of greater than 1. The addition of component (d) in said U.S. Patent is stated to result in moldings with improved surface characteristics.

U.S. Pat. No. 4,673,706 teaches the addition of crosslinkable vinyl monomers and epoxy compounds to low shrinking polyester molding compositions containing unsaturated polyesters results in moldings with improved surface characteristics.

U.S. Pat. No. 4,755,557 teaches a molding composition comprising an unsaturated polyester resin, an ethylenically unsaturated monomer, copolymerizable with said polyester resin, a thermoplastic low profile additive wherein the improvement consists of adding lactone monomer at 2-20 parts per hundred of the combined weight of unsaturated polyester resin, ethylenically unsaturated monomer and thermoplastic low profile additive resulting in improved surface and shrinkage control.

In addition to the chemically thickened molding compositions mentioned above there is still a major and even growing interest in compositions that are not chemically thickened. These are widely used and are of particular interest in the high speed process of injection molding. Because of the inherent faster cycles and the ability to automate easier than compression molding this process is undergoing great growth for the production of automotive body panels from thermosetting unsaturated polyester fiber reinforced molding materials. Many times unthickened compounds are desired here because of the ability to control compound viscosity consistency better and longer shelf life of the material without requiring machine and molding parameter changes. Also in this type of material there is the need to obtain better surface smoothness and shrinkage control for increasing product demands.

A problem with these chemically unthickened molding compounds is that unless the unsaturated polyester resin structure and low profile additive structure are very carefully matched the organic materials tend to seperate in the compound upon storage. This can result in a phenomenon called "scumming" in which a haze or film is observed on the molded part and even on the mold itself. This is highly undesirable because it can cause part sticking in the mold, surface deterioration and possibly paint adhesion problems. The presence of this "scumming" is best analyzed by observing the shiny character or gloss of the molded part as whenever it is present this property is reduced.

This separation problem and scumming greatly limits unsaturated polyester resin and low profile additive structures that can be utilized and overcoming it would be a major improvement. Such an improvement could also apply broadly to other unsaturated polyester resin fabrication techniques such as pultrusion, resin transfer molding and compression molding.

Also there is a special application for these compositions and that is in the production of complex shaped headlamp reflectors parts for automobiles and trucks. The nature of this application makes it desirable that the compound have as low a coefficient of thermal expansion as possible to maintain constant light focus as the headlamp increases in temperature with use.

OBJECTS OF THE INVENTION

It is an object of the present invention to provide molding materials with
1. Improved shrinkage control and surface appearance.
2. Decreased tendency to scum.
3. Lower coefficients of thermal expansion

SUMMARY OF THE INVENTION

The present invention provides a means for making low shrink curable molding compositions having improved surface appearance, resistance to "scumming", (polyester resin/low profile additive separation) and a reduction in the coefficient of thermal expansion. Advantages are accomplished in both unthickened and chemically thickened systems. This is accomplished by a composition comprising:
(a) a thermosetting polyester resin,
(b) an olefinically unsaturated monomer, that is copolymerizable with polyester resin,
(c) a low profile additive for shrinkage control, and
(d) lactams or substituted lactams either with or without copolymerizable groups.

DETAILED DESCRIPTION OF THE INVENTION

Thermosetting polyester resins suitable for use in accordance with the invention are polyester resins that are reaction products of a dicarboxylic acid or anhydride, with a polyhydric alcohol. The dicarboxylic acids or anhydrides that are employed to produce the polyester, either singly or in combination, must include those that contain olefinic unsaturation, preferably wherein the olefinic unsaturation is alpha, beta- to at least one of the carboxlyic acid groups. Such acids include maleic acid or anhydride, fumaric acid, methyl maleic acid, and itaconic acid. Maleic acid or anhydride and fumaric acid are the most widely used commercially.

In addition to the olefinically unsaturated acid or anhydride, saturated and/or aromatic dicarboxylic acids or anhydrides can also be employed in producing the polyester. Such acids include phthalic acid or anhydride, terephthalic acid, hexahydrophthalic acid or anhydridem adipic acid, isophthalic acid, and "dimer" acid (i.e., dimerized fatty acids).

A polyol is also employed to produce the polyester. Such polyols include ethylene gylcol, diethylene glycol, propylene glycol, dipropylene glycol, butylene glycols, neopentyl glycol, glycerol and 1,1,1-trimethylol-propane. As a rule, not more than about 20 mole percent of the polyol will be a triol, with the remainder being one or more diols.

As is known in the art, polyesters that are employed in thickened molding compositions must contain residual acidity in order to enter into the thickening reaction. The nature and production of the polyesters used in such applications, such as dicyclopentadiene modified resins, are known in the art and are described in U.S. Pat. No. 3,933,757 and U.S. Pat. No. 3,883,612.

Vinyl ester resins that have been advantageously employed in both bulk molding compounds (BMC) and sheet molding compounds (SMC) are resins wherein the secondary hydroxyl group formed by the interaction of an epoxide group with a carboxylic acid group has been reacted with a dicarboxylic acid anhydride to produce pendant carboxylic acid groups. A variety of saturated and unsaturated anhydrides similar to those described as useful in preparing polyester resins may be used in proportions of at least about 0.1 mole of anhydride per equivalent of hydroxyl group up to an amount sufficient to react with each hydroxyl.

Thermosetting resins that are classified herein as vinyl ester resins, which contain the characteristic linkages and terminal polymerizable unsaturated groups, are fully disclosed in U.S. Pat. No. 3,887,515 along with the preparation of such resins and further description of these well known resins is unnecessary herein.

The curable compositions of the invention also contain an olefinically unsaturated monomer which is copolymerizable with the polyester or vinyl ester resins. Styrene is the preferred monomer in commercial practice today, although others can be used.

The olefinically unsaturated monomer is also employed in the resin composition for the purpose of dissolving the thermosetting resin (which is a solid at ambient temperatures, i.e., about 20° C.-25° C.) to ensure that the resin composition is a fluid. Enough monomer is employed so that the thickness or viscosity of the fluid is such that the fluid can be processed conveniently. Excessive amounts of the monomer are normally to be avoided, because such excess can have an adverse effect on properties. For instance, too much of the monomer may tend to cause embrittlement of the cured polyester. Within these guidelines, effective proportions of the olefinically unsaturated monomer are normally found within the range of from about 25 to about 70, and preferably 40 to 55, weight percent, based on total weight of polyester resin, monomers, and thermoplastic additive.

Examples of monomers other than styrene are vinyl toluene and various acrylates, particularly methyl methacrylate.

An essential component of the compositions of the invention are low profile additives. These can be polymers of vinyl acetate, acrylics, saturated polyesters, polyurethanes, styrene-butadiene and similarly used materials.

Suitable vinyl acetate polymer low profile additives are poly(vinyl acetate) homopolymers and thermoplastic copolymers containing at least 50 weight percent vinyl acetate. Such polymers include, for example, vinyl acetate homopolymer; carboxylated vinyl acetate polymers include copolymers of vinyl acetate and etylenically unsaturated carboxylic acids, such as acrylic acid, methacrylic acid, maleic acid, fumaric acid, itaconic acid and the like or anhydrides such as maleic anhydride; vinyl acetate/vinyl chloride/maleic acid terpolymer, and the like. Reference is made to U.S. Pat. Nos. 3,718,714 and 4,284,736 and British Patent No. 1,361,841 for descriptions of some of the suitable vinyl acetate polymer low profile additives.

The useful vinyl acetate polymer low profile additives ordinarily have molecular weights within the range of from about 10,000 to about 250,000, and preferably from about 25,000 to about 175,000. They are usually employed in proportions of from about 5 to 25, and preferably from about 9 to 16, weight percent, based on the total weight of polyester resin, low profile additive, and monomers.

Suitable saturated polyester low profile additives are, in general, low molecular weight saturated polymers of polymerizable linear and/or cyclic esters and carboxylated saturated polymers and said polymerizable esters having at least one carboxyl group per molecule.

Polymer of linear and/or cyclic esters, including carboxylated polymers having an average of at least one carboxyl group per molecule which maybe used in accordance with the present invention are those which possess a reduced viscosity of at least about 0.1, and preferably from about 0.15 to about 15 and higher. The preferred polymers of cyclic esters have a reduced viscosity of about 0.2 to about 10.

Thermoplastic saturated polymers of linear and/or cyclic esters are well known and the carboxylated saturated esters are well known and such thermoplastic saturated polymers, and particularly polymers prepared from epsilon caprolactones, have been advantageously employed as low profile additives. Reference, for example is made to U.S. Pat. Nos. 3,549,586 and 3,668178 to Comstock et. al. for descriptions of thermoplastic saturated polyester low profile additives and carboxylated thermoplastic saturated polyester low profile additives prepared from cyclic esters.

Other thermoplastic saturated polyesters which are useful as low profile additives are those based on condensation products of, primarily, dicarboxylic acids and organic diols. Some examples of such diacids are adipic acid, isophthalic acid terephthalic acid and the like and such glycols could be ethylene glycol, diethyl glycol, neopentyl glycol and the like.

The low profile additives may usually be employed in the compositions of the invention in proportions from about 5 to 25 weight percent, and preferably from about 10 to 20 weight percent, based on the total weight of polyester resin, low profile additive, and monomers.

Also suitable in certain aspects of the invention are thermoplastic polyalkyl acrylate or methacrylate low profile additives including, for example, homopolymers of methyl methacrylate, ethyl methacrylate, butyl methacrylate, methyl acrylate, ethyl acrylate; copolymers of methyl methacrylate and lower alkyl esters of acrylic and methacrylic acids, and copolymers of methyl methacrylate with minor amounts of one or more of the following: lauroyl methacrylate, isobornyl methacrylate, acrylamide, hydroxyethyl methacrylate, styrene, 2-ethylexyl acrylate, acrylonitrile, methacrylic acid, polystyrene, styrene copolymers, such as styrene/butadiene copolymers, cellulose acetate butyrate, alkylene oxide polymers, urethane polymers, and the like.

Molecular weight of the alkyl acrylate or methacrylate polymers useful in the invention may vary over a wide range, from 10,000 to 1,000,000 and preferably from 25,000 to 500,000.

This class of low profile additive should be present in amounts ranging from 1 to 25 percent by weight, based on the weight of polyester resin, low profile additive, and monomers, preferably from 5 to 20 percent by weight.

Urethane polymers can be employed in this invention, alone or as mixtures with other low profile additives, are broadly structured and some examples can be found in such references as U.S. Pat. No. 4,035,439, 1975; EP 74 746, 1981; and U.S. Pat. No. 4,421,894.

An optional component of the compositions of the invention is a viscosity reducing agent which is an aliphatic monocarboxylic acid having at least carbon atoms.

Suitable aliphatic monocarboxylic acids have at least 6 carbon atoms in the chain. Frequently these materials are a saturated or unsaturated fatty acid having from 6 to 24 or more carbon atoms in the chain. Such carboxylic acids may be caproic (hexanoic), caprylic (octanoic), capric ($C_{10}$), lauric ($C_{14}$), palmitic ($C_{16}$), palmitoleic ($C_{16}$), stearic ($C_{18}$), oleic ($C_{18}$), linoleic ($C_{18}$), and the like acids, and the acids may be either straight chain or branched chain. Product in which mixtures of acids of the foregoing kind occur, such as tall oil acid, may be used.

The viscosity reducing aqent can be present in amounts ranging from 0.4 to about 6 weight percent, and preferably from about 1 to 4 weight percent, based on the total weight of the polyester resin, monomers and low profile additive.

When desired a thickening agent can also be employed in the compositions of the invention. Such materials are known in the art, and include the oxides and hydroxides of the metals of Group I, II and III of the Periodic Table. Illustrative examples of thickening agents include magnesium oxide, calcium oxide, calcium hydroxide, zinc oxide, barium oxide, magnesium hydroxide, and the like, including mixtures of the same. Thickening agents are normally employed in proportions of from about 0.1 to about 6 weight percent, based upon weight of polyester resin, pluse monomer, plus low profile additive.

Alternatively, a dual thickening system maybe employed wherein, for example, a metallic oxide or hydroxide and polyisocyanate in amounts of polyisocyanate sufficient to react with at least thirty percent of the hydroxyl groups but not more than one hundred and five percent of the hydroxyl groups present and an amount of metallic oxide or hydroxide sufficient to react with at least thirty percent of the carboxyl groups present. Reference is made to the Belgium Patent No. 849,135 for a description of such dual thickening systems.

The lactams of this invention can be broadly based with a wide variety of substituents. The basic molecular structure is show below.

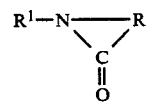

Where R is a divalent hydrocarbon or substituted hydrocarbon moiety containing from 2 to 36 carbon atoms to which a variety of organic substituents can be attached. And where $R^1$ is hydrogen, alkyl groups, aromatic groups or unsaturated moieties.

Some specific examples of such materials are propolactam, valerolactam, epsilon-caprolactam, pyrrolidone caprylactam, dodecalactam.

Some structural examples are shown below:

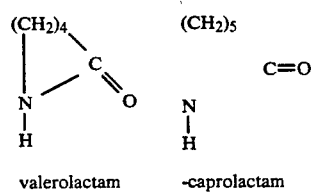

valerolactam    -caprolactam

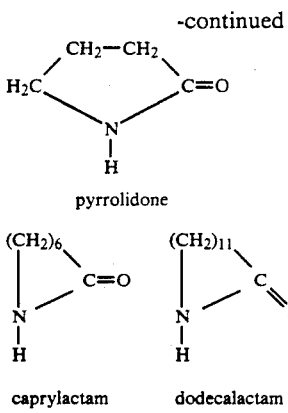

pyrrolidone, caprylactam, dodecalactam

A variety of substituted versions of these can also be employed. Particularly favored are substitution from the nitrogen moiety. Most favored of these are alkyl and alkenyl derivatives such as methyl, ethyl, propyl and the like; and vinyl, isopropenyl, allyl and the like. Specific examples are N-methyl caprolactam, N methyl pyrrolidone and the like; also N-vinyl pyrrolidone and N-vinyl caprolactam and the like.

While the amount of lactam used in the practice of the invention is not narrowly critical it is preferred to use about 1 to about 25 parts per hundred parts of the combined polyester resin, monomers, and low profile additive. More preferred by about 2 to 10 parts per hundred parts is employed. These lactams additives can also be used advantageously in combination with the epoxy and secondary monomer additives described in the background to this invention.

The polyester molding compositions may also contain one or more of the known types of conventional additives, which are employed for their known purpose in the usual amounts. The following are illustrative of such additives:

(1) Polymerization initiators such as t-butyl hydroperoxide, t-butyl perbenzoate, benzoyl peroxide, t-butyl peroctoate, methyl ethyl ketone peroxide, and others known to the art. The polymerization initiator is employed in a catalytically effective amount, such as from about 0.3 to about 2 to 3 weight percent, based on the weight of the polyester plus monomer plus low profile additive;

(2) Fillers such as clay, hydrated alumina, silica, calcium carbonate and others known to the art;

(3) Reinforcing fillers such as glass fibers or fabrics, asbestos fibers or fabrics, various organic fibers or fabrics such as those made of polypropylene, acrylonitrile/vinyl chloride copolymer, and others known to the art;

(4) Mold release agents or lubricants, such as zinc stearate, calcium stearate, calcium stearate, and others known to the art; and (5) Rubbers or elastomers such as: (a) homopolymers or copolymers of conjugated dienes have a weight average molecular weight of 30,000 to 400,000 or higher as described in U.S. Pat. No. 4,020,036. The conjugated dienes contain from 4-12 carbon atoms per molecule such as 1,3 butadiene, isoprene, and the like; (b) epihalohydrin homopolymers, a copolymer of two or more epihalohydrin monomer(s), or a copolymer of an epihalohydrin monomer(s) with an oxide monomer(s) having a number average molecular weight (Mn) which varies from about 800 to about 50,000 as described in U.S. Pat. No. 4,101,604; (c) chloroprene polymers including homopolymers of chloroprene and copolymers of chloroprene with sulfur and/or with at least one copolymerizable organic monomer wherein chloroprene constitutes at least 50 weight percent of the organic monomer makeup of the copolymer as described in U.S. Pat. No. 4,161,471; (d) hydrocarbon polymers including ethylene/propylene dipolymers and copolymers of ethylene/propylene and at least one nonconjugated diene, such as ethylene/propylene/hexadiene terpolymers and ethylene/propylene/1,4-hexadiene/norbornadiene, as described in U.S. Pat. No. 4,161,471; (e) conjugated diene butyl elastomers, such as copolymers consisting of from 85 to 99.5% by weight of a $C_4$-$C_7$ isolefin combined with 15 to 0.5% by weight of a conjugated multi olefin having 4 to 14 carbon atoms, copolymers of isobutylene and isoprene where a major portion of the isoprene units combined therein have conjugated diene unsaturation as described in U.S. Pat. No. 4,160,759.

Whereas the exact scope of the instant invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

DEFINITIONS

OCF-1652: An unsaturated polyester resin produced by Owens Corning Fiberglass and based on maleic anhydride and propylene glycol containing about 37 weight percent of styrene.

Union Carbide LP-40A: A product of Union Carbide Corporation which is a low profile additive base on a copolymer of vinyl acetate and acrylic acid dissolved to 40 weight percent in styrene monomer (60 weight percent).

Modifier E: A product of Aristech Chemical comprising 5 weight percent of parabenzoquinnone (PBQ) in diallyphtalate.

Byk W-990: A viscosity reducer sold by Byk-Chemie.

VR-3: A viscosity reducer sold by Union Carbide.

Calwhite II: A calcium carbonate filler of 5 micron average particle size sold by Georgia Marble.

Aristech MR-13031: A phthalic anhydride modified maleic anhydride propylene glycol based unsaturated polyester resin containing about 38 weight percent styrene and sold by Aristech Chemical.

FLEXOL EP-8: An epoxy based plasticizer sold by Union Carbide Corporation which is epoxidized octyl tallate.

EPON-828: A Bis Phenol A based epoxy resin sold by Shell, Inc.

NOURY TBIC: A peroxide catalyst derived from a percarbonate sold by Noury Chemicals.

PG-9033: A 40% magnesium oxide dispersion sold by Plasticolors, Inc.

PPG-521: Fiberglass roving supplied by PPG industries.

LP-90: A poly(vinyl acetate) low profile additive supplied by Union Carbide as a 40 weight percent solution in styrene.

ERL-4221: A cycloaliphatic diepoxide supplied by Union Carbide.

EXPERIMENTAL SECTION

General Procedure for Preparation of Bulk Molding Compound (BMC) Formulations All the liquid components were weighed individually into a Hobart mixing pan placed on a Toledo balance. The pan was attached to a Model C-100 Hobart mixer (in a hood). The agitator was started at slow speed, then increased to medium speed to completely mix the liquids over a period of 3-5 minutes. The agitator was then stopped and the internal mold release agent and/or fatty acid was next added to the liquid from an ice cream carton. The Hobart mixer was restarted and the mold release agent mixed with the liquid until it was completely wet out. The filler was next added to the pan contents (agitator off) then mixed, using medium to high speed, until a consistent paste was obtained. The mixer was again stopped and the weighed amount of thickening agent, if desired, was mixed into the paste over a period of 2-3 minutes, the mixer was again stopped and 175 grams of the paste were removed from the pan (using a large spatula) and transferred to a wide mouthed 4 oz. bottle. This paste sample was stored in the capped bottle at room temperature and the viscosity was measured periodically using a Model HBT 5X Brookfield Synchro-Lectric Viscometer on a Helipath Stand.

After removal of the paste sample, the contents were reweighed and styrene loss made up, the chopped glass fibers were added slowly (from an ice cream carton) to the paste with the mixer running on slow speed. The mier was run for approximately 30 seconds after all the glass was in the paste. This short time gave glass wet without glass degradation. The pan was then removed from the mixer and separate portions of the BMC mix of a appropriate amount were removed using spatulas and transferred to aluminum foil lying on a balance pan (balance in the hood). The mix was tightly wrapped in the aluminum foil (to prevent loss of styrene via evaporation) and stored at room temperature until the viscosity of the retained paste sample reached molding viscosity is chemically thickened. The weight of the BMC added to the foil varies with the molding application.

General Procedures for Preparation of Sheet Molding Compound (SMC) Formulations All the liquid components were weighed individually into a 5 gallon open top container placed on a Toledo balance. The contents of the container were the mixed (in a hood) with a high speed Cowles type dissolver. The agitator was started at a slow speed, the increased to medium speed to completely mix the liquids over a period of 2-3 minutes. The mold release agent and/or fatty acid was next added to the liquids from an ice cream carton and mixed until completely dispersed. The filler was next added gradually from a tared container until a consistent paste was obtained and the contents were then further mixed to a minimum temperature of 90° F. The thickener was next mixed into the paste over a period of 2-3 minutes, the mixer was stopped and approximately 175 grams of the paste was removed from the container and transferred to a wide mouthed 4 oz. bottle. The paste sample was stored in the capped bottle at room temperature and the viscosity measured periodically using a Model HBT 5X Brookfield Synchro Lectric Viscometer on a Helipath Stand.

The balanced of the paste is next added to the doctor boxes on the SMC machine where it is further combined with fiber glass (approximately 1" fibers). The sheet molding compound (SMC) is then allowed to mature to molding viscosity and then molded into the desired article.

Molding

Flat panels 18 inches × 18 inches of varying thickness were molded using an extremely smooth, highly polished matched metal die set of chrome plated molds. Both platens are oil heated separately to allow for varying temperature. The molding was conducted in a 200 ton press and the panel removed with the aid of ejector pins. A standard molding temperature is 300°-305° F. at pressures of 500 or 1000 psi. Laminate thicknesses are typically 0.10 and 0.125 inches.

Method of Shrinkage Measurement

A 18"×18 "X 0.125" flat panel is molded in a highly polished chrome plated matched metal die mold in a 200 TON press. The exact dimensions of the four sides of this mold are measured to the ten-thousandths of an inch at room temperature. The exact length of the four sides of the flat molded panel is also determined to the ten thousandths of an inch. These measurements are substituted into the equation below:

$(a-b)/a = $ inch/inch shrinkage inch/inch shrinkage $\times 1000 = $ mils/inch shrinkage $a = $ the sum of the lengths of the four sides of the mold
$b = $ the sum of the lengths of the four sides of the molded panel.

A positive (+) number recorded indicates an expansion of the molded part as measured at room temperature compared to the dimensions of the mold measured at room temperature. A negative (−) number indicates shrinkage by the same comparison. The larger the positive number the better the performance.

Surface smoothness and gloss evaluations were done visually with the aid of a light box fitted with straight lines of one inch by one inch squares. The "trueness" of the reflection of these lines from the molded panel was a judgement of surface smoothness. Long term waviness is a judgement of the overall straightness of single lines across the entire panel while short term waviness is a judgement of the sharpness (width) of the line. Gloss is judged by how shiny and bright the panel is. The less "scumming" the better the gloss.

Method for Measurement of the Coefficient of Thermal Expansion

APPARATUS: Model 305 Dilatometer
COMPANY: Anter Laboratories
PROCEDURE:

In order to measure the coefficient of thermal expansion of plastic materials the following procedure is employed.

(1) Three specimens for each sample are cut on a diamond saw to the following 1.00"×3.00".

(2) The specimens are labelled and placed for 40 minutes in a post bake oven set at 180°. The specimens are removed and allowed to stand overnight in a humidity/temperature controlled laboratory. The length of the specimens are measured to 0.001" and recorded.

(3) The extension rod for each of three dilatometer chambers is checked for free movement. The specimens are placed in each of the chambers and checked for good seating by withdrawing and releasing the extension rod several times. The sample chamber is then covered with the insulator cover plate and stainless steel lid.

(4) The specimens are allowed to equilibrate to chamber temperature in the case 25° usually for 30 minutes. Duplicate readings over a 30 minute period indicates this.

(5) The dial gauges are read and recorded for each specimen to an accuracy of 0.0001":.

good surface smoothness characteristics. To provide a measure of the ability of the subject materials to improve shrinkage control characteristics the following non-chemically thickened BMC formulations were run and tested for shrinkage control, visual surface appearance and coefficient of thermal expansion (CTE). Formulations are shown in Table 1 and represent examples 1 thru 8. Results for shrinkaqe control, surface appearance and CTE are shown in Table II. In all cases of visual observation the lowest number indicates the best results.

TABLE I

| 9CGR119 | 1 | 2 | 3 | 4 | 5 | 6 | 7 | 8 | 8A |
|---|---|---|---|---|---|---|---|---|---|
| OCF-1652 | 62 | → | | | | | | | → |
| Union Carbide 40A | 38 | → | | | | | | | → |
| Caprolactam | — | 4 | — | — | — | — | — | — | |
| Vinyl Caprolactam | — | — | 4 | 2 | — | — | — | — | |
| Pyrrolidone | — | — | — | — | 4 | — | — | — | |
| Vinyl Pyrrolidone | — | — | — | — | — | 4 | — | — | |
| Valerolactam | — | — | — | — | — | — | 4 | — | |
| Caprylolactam | — | — | — | — | — | — | — | 4 | |
| ERL-4221 | | | | | | | | | 4 |
| t-Butyl perbenzoate | 1.5 | | | | → | | | | 1.5 |
| t-Butyl peroctoate (50%) | 0.2 | | | | → | | | | 0.2 |
| 5% parabenzoquinnone diallyl phthalate | 0.4 | | | | → | | | | 0.4 |
| BYK W-9990 | 2.0 | | | | → | | | | 2.0 |
| Zn Stearate | 1— | 4.0 | | | → | | | | 4.0 |
| Union Carbide VR-3 | 3— | — | — | — | — | — | — | — | — |
| Calwhite II | 320 | | | | → | | | | → |
| ¼" Glass, 20% by wt. | | | | | | | | | |

18" × 18" × 0.125" flat panels were molded at 300° F. for 60 seconds at 1000 psi pressure.

TABLE II

| | | | Waviness | | | ×20⁶ |
|---|---|---|---|---|---|---|
| Example | Additive | Shrinkage Control | Long Term | Short Term | Gloss | CTE in/in °C. |
| 1 | None | +0.15 | 2.5 | 3 | 3.0 | 11.1 |
| 2 | Caprolactam | +0.40 | 2.5 | 2.5 | 1.0 | 10.0 |
| 3 | N-Vinyl Caprolactam | +0.45 | 2.0 | 2.0 | 1.0 | 9.1 |
| 4 | N-Vinyl Caprolactam | +0.40 | 2.5 | 2.5 | 1.0 | 9.7 |
| 5 | Pyrrolidone | +0.27 | 2.5 | 3.0 | 1.0 | 10.6 |
| 6 | N-vinyl pyrrolidone | +0.58 | 2.5 | 2.0 | 1.0 | 8.3 |
| 7 | Valerolactam | +0.27 | 2.0 | 2.0 | 1.0 | 9.7 |
| 8 | Caprylolactam | +0.31 | 2.5 | 3.0 | 1.5 | 10.3 |
| 8A | ERL-4221 | — | — | — | — | 12.7 |

(6) The instrument heating chamber is turned on and is set to an upper limit temperature and 120° which is achieved in about 20 minutes. Ample time is alloted for the specimens to equilibrate (usually in one to two hours). Duplicity in the periodic reading of the dial gauges indicate equilibration. Once equilibration is achieved the final reading is taken.

(7) The calculation is as follows:

$$(D_{120}-D_{25})/(L \times 25°) = CLTE \text{ (in/in/° C.)}$$

where $D_x$ is deflection at temperature x, L is length of specimen, CLTE is coefficient of linear thermal expansion.

Examples

Shrinkage control is normally indicative of the ability of a system to reproduce mold surfaces and to provide A gloss rating of 1.0 indicates no evidence of scumming.

In all cases when compared to an identical formulation containing a poly(methyl methacrylate) as a low profile additive the above formulations yield much smoother surfaces.

EXAMPLE 9

In another unthickened BMC formulation using another structure of unsaturated polyester resin similar results were achieved.

TABLE III

| | PBW | |
|---|---|---|
| | Comparative Test | Example 9 |
| Aristech MR-13031 | 60 | 60 |
| Union Carbide LP-40A | 40 | 36 |
| E-Caprolactam | — | 4 |
| Styrene | 4.8 | 4.8 |
| t-Butyl Perbenzoate | 1.2 | 1.5 |
| t-Butyl Peroctoate (50%) | 0.2 | 0.2 |
| 5% PBQ[1] in Diallyl Phthalate | 0.4 | 0.4 |
| Zinc Stearate | 1.9 | 1.9 |
| Calcium Stearate | 1.9 | 1.9 |
| Calwhite II | 230 | 230 |
| ¼" Glass Fiber Wt. % | 20 | 20 |
| Shrinkage Control | +0.25 | +0.73 |
| Gloss Rating | 3.3 | 1.5 |

[1]parabenzoquinnone
18"× 8" × 0.125" Panels molded at 300° F. for 60 seconds at approximate 1000 psi pressure.

EXAMPLES 10-12

The examples below are designed to show the effectiveness of these structures in the presence of an epoxy resin and secondary monomer surface improvers as revealed in U.S. Pat. Nos. 4,515,498, 4,374,215 and 4,673,706.

TABLE IV

| | PBW | | | | | |
|---|---|---|---|---|---|---|
| | Control −1 | Control −2 | Example 10 | Example 11 | Control −3 | Example 12 |
| Aristech 13031 | 60 | 60 | 60 | 60 | 60 | 60 |
| LP-40A | 36 | 36 | 36 | 36 | 36 | 36 |
| Styrene | 4.8 | 4.8 | 4.8 | 4.8 | 4.8 | 4.8 |
| Vinyl acetate monomer | 1.3 | 1.3 | 1.3 | 1.3 | 1.3 | 1.3 |
| Flexol EP-8 | — | 2.7 | 2.7 | 2.7 | — | — |
| EPON 828 | — | — | — | — | 2.7 | 2.7 |
| E-Caprolactam | — | — | 1.5 | 2.0 | — | 1.5 |
| Zinc Stearate | 1.9 | 1.9 | 1.9 | 1.9 | 1.9 | 1.9 |
| Calcium Stearate | 1.9 | 1.9 | 1.9 | 1.9 | 1.9 | 1.9 |
| t-Butyl perbenzoate | 1.5 | 1.5 | 1.5 | 1.5 | 1.5 | 1.5 |
| t-Butyl peroctoate (50%) | 0.4 | 0.4 | 0.4 | 0.4 | 0.4 | 0.4 |
| Calwhite II | 230 | 230 | 230 | 230 | 230 | 230 |
| CaO | — | 0.5 | 0.5 | — | — | — |
| ¼" Glass Wt. % | 20 | 20 | 20 | 20 | 20 | 20 |
| Shrinkage Control | −0.125 | +0.06 | +0.27 | +0.33 | +.062 | +.0.27 |
| Gloss | 3.5 | 3.5 | — | 2.0 | — | — |

(Lowest Number Best)

EXAMPLE 13

The effectiveness of the lactam type additives in sheet molding compound formulations is shown in the following example.

TABLE V

| | PBW | |
|---|---|---|
| | Control | Example |
| Freeman 3941 | 58 | 58 |
| Union Carbide LP-40A | 38 | 38 |
| Styrene | 10 | 10 |
| N-Vinyl Pyrrolidone | — | 4 |
| Modifier E | 0.4 | 0.4 |
| Noury TBIC | 2.0 | 2.0 |
| Union Carbide VR-3 | 2.0 | 2.0 |
| Zinc Stearate | 2.0 | 2.0 |
| Calwhite II | 190 | 190 |

TABLE V-continued

| | PBW | |
|---|---|---|
| | Control | Example |
| PG-9033 | 1.65 | 1.65 |
| 1" Glass Wt. % PPG-521 | 29 | 29 |

The above formulations were combined as described in the SMC preparation procedure and aged in an 80° room until at adequate molding viscosity. Flat panels 18"×18"×0.125" and 18"×18"×0.10" were molded under a variety of conditions for example at 305°/295° F. at 1000 psi pressure and at 500 psi pressure at a cure time of 90 seconds. Visual surface evaluations showed that the formulation containing N vinyl pyrrolidone had a smoother surface than the formulation without the N-vinyl pyrrolidone.

EXAMPLE 14

Formulations containing the lactam additives were injection molded with a group of unsaturated polyester resins to demonstrate the capability of using these materials to reduce scumming and gloss.

Three polyester resins were employed. Polyester Resin 1 was produced from maleic anhydride and propylene glycol alone, Polyester Resin 2 had about 7 percent of the maleic anhydride replaced with phthalice anhydride, and Polyester 3 had about 15 percent of the maleic anhydride replaced with phthalic anhydride. All contained equal amounts of styrene monomer. In a standard calcium carbonate filled formulation with Union Carbide LP 40A scumming is experienced with Polyester Resin 1 and not with Polyester Resin 2 and 3. Similar formulations were made containing 2.25 parts of E-caprolactam for every 100 parts of styrenated polyester resin and LP 40A.

Results of injection moldings conducted at molding temperatures of 340° F. producing a plaque 19 inches×8 inches×0.125 inches containing two ribs about 1/16 inches wide and ⅜ inches deep.

Results of visual evaluation are shown below with the highest number being best.

| Resin | Low Profile Additive | Presence of E-Caprolactam | Scumming | Sink Over Ribs | Long Term Waviness | Short Term Waviness |
|---|---|---|---|---|---|---|
| Polyester-1 | LP-40A | No | Yes | — | — | — |
| Polyester-1 | LP-40A | Yes | Sight to None | 10 | 9.5 | 8.5 |
| Polyester-2 | LP-40A | Yes | None | 7.2 | 6.2 | 8.0 |
| Polyester-3 | LP-40A | No | None | 6 | 4.5 | 7 |

EXAMPLE 15

Further example of the effectiveness of the lactam based materials is shown in this example.

| | Control | Example |
|---|---|---|
| OCF-1652 | 62 | 62 |
| Union Carbide LP-90 | 38 | 38 |
| N-Vinyl Pyrrolidone | — | 4 |
| t-Butyl Perbenzoate | 1.5 | 1.5 |
| t-Butyl Peroctoate (50%) | 0.2 | 0.2 |
| Modifier E | 0.4 | 0.4 |
| BYK W-990 | 2.0 | 2.0 |
| Zinc Stearate | 4.0 | 4.0 |
| Calwhite II | 320 | 320 |
| ¼" Glass Wt. Percent | 20 | 20 |
| Shrinkage Control mils/inch | +0.2 | +0.4 |
| CTE × $10^6$ in/in/°C. | 14.3 | 13.0 |

EXAMPLE 16

Similar experiments to those conducted in Examples 1-8 were done incorporating a poly(methyl methacrylate) low profile additive in place of the poly(vinyl acetate) based additive with the lactams and substituted lactams showing the same advantages of surface smoothness and shrinkage control improvements.

EXAMPLE 17

Similar experiments to those conducted in Example 1-8 were done incorporating a poly(urethane) polymer based low profile additive in place of the poly(vinyl acetate) based additive with the lactams and substituted lactams showing the sam advantages of shrinkage control and surface smoothness improvements.

EXAMPLE 18

Similar experiments to those conducted in Examples 1-8 were done incorporating a poly(caprolactone) low profile additive in place of the poly(vinyl acetate) based material showing the same advantages of shrinkage control and surface smoothness improvement.

We claim:

1. A molding composition comprising an unsaturated polyester resin, styrene, a low profile additive selected from the group consisting of poly(vinyl acetate), poly(methyl methacrylate) and poly urethane polymers, where the improvement consists of adding a lactam or N-substituted lactam selected from the group consisting of valerolactam, pyrrolidone, caprolactam, caprylolactam,, dodecylactam, and N-methyl pyrrolidone, in an amount ranging from 2 to 20 parts per hundred parts of polyester resin, styrene and low profile additive.

2. The molding composition of claim 1 wherein both a peroxide and a mold release agent is employed.

3. The molding composition of claim 1 wherein filler is also employed.

4. The molding composition of claim 1 wherein a thickening agent is employed.

5. Molded parts produced from the composition of claim 1.

* * * * *